United States Patent [19]

Brown et al.

[11] Patent Number: 5,202,082

[45] Date of Patent: Apr. 13, 1993

[54] METHOD AND APPARATUS FOR REPLACING A NOZZLE

[75] Inventors: Steve K. Brown, Lynchburg; Larry D. Dixon, Forest; Samuel J. Moses, Lynchburg, all of Va.

[73] Assignee: B&W Nuclear Service Company, Lynchburg, Va.

[21] Appl. No.: 808,506

[22] Filed: Dec. 17, 1991

[51] Int. Cl.$^5$ .............................................. G21C 13/00
[52] U.S. Cl. .................................. 376/260; 376/307; 29/890.031
[58] Field of Search ...................... 376/307, 260, 203; 165/104.27, 104.32; 29/402.02, 402.06, 402.08, 890.031, 890.038, 890.043, 906

[56] References Cited

U.S. PATENT DOCUMENTS

| | | | |
|---|---|---|---|
| 4,255,840 | 3/1981 | Loch et al. | 376/307 |
| 5,091,140 | 2/1992 | Dixon et al. | 376/260 |
| 5,094,801 | 3/1992 | Dixon et al. | 376/307 |

*Primary Examiner*—Daniel D. Wasil
*Attorney, Agent, or Firm*—Robert J. Edwards; D. Neil LaHaye

[57] ABSTRACT

A replacement nozzle and heater sleeve for a nuclear reactor coolant system pressurizer. The heater, damaged heater sleeve exterior of the pressurizer and a portion of the heater sleeve inside the heater sleeve bore are removed. The heater sleeve bore is partially tapped to provide threads at its lower end. A sleeve having a first seal ring positioned at its upper end is threaded into the heater sleeve bore such that the first seal ring presses against the original heater sleeve and provides a seal. A second seal ring on a flange on the sleeve is pressed into sealing engagement with the exterior of the pressurizer.

4 Claims, 1 Drawing Sheet

METHOD AND APPARATUS FOR REPLACING A NOZZLE

BACKGROUND OF THE INVENTION

1. Field of the Invention

The present invention is generally related to nuclear system pressurizers and in particular to the replacement of nozzle or heater sleeve penetrations in the pressurizers.

2. General Background

The pressurizer in a nuclear reactor coolant system establishes and maintains the reactor coolant system pressure within the prescribed limits of the system. It provides a steam surge chamber and a water reserve to accommodate reactor coolant density changes during operation. A typical pressurizer is a vertical, cylindrical vessel with replaceable electric heaters in its lower section. The electric heaters are positioned below the normal water line and are actuated to restore normal operating pressure when the pressure in the reactor coolant system has decreased. The pressurizer also contains a plurality of nozzles at various locations for purposes such as sensing the liquid level or temperature in the pressurizer.

The electric heaters are comprised of a plurality of heating elements that extend through nozzles or sleeve penetrations through the wall of the pressurizer. Support plates inside the pressurizer are provided with holes in coaxial alignment with the holes in the pressurizer wall and the sleeves for receiving and supporting the heating elements. The sleeves extend outward from the pressurizer to provide exterior support to the heating elements. Due to the operating environment, it is a common requirement that heating elements and the sleeves through which they extend be replaced. Because alignment between the support plate holes and the sleeve is critical, it has previously been required that the replacement sleeve be fabricated to original design dimensional specifications and installed into the original bore in the pressurizer wall to insure proper alignment of the sleeve inner diameter with the corresponding support plate hole after welding. This process required that the removal of the original sleeve weld and installation of the repair weld be performed from inside the pressurizer because the bore through the pressurizer could not be enlarged for tooling access without potentially altering the alignment of the heater penetration with respect to the holes in the support plates. It is also a common requirement that nozzles used for penetration of level sensing and thermowell equipment into the pressurizer be replaced. Replacement of such nozzles presents very similar considerations and problems encountered when replacing heater sleeves. Since pressurizer components in nuclear power plants become radioactive after they have been in operation, performing such work inside the pressurizer is difficult and hazardous to personnel and thus impractical. Related patents that applicants are aware of include the following.

U.S. Pat. No. 4,255,840 discloses a method for replacing a defective immersion heater in a pressurizer. However, this patent is limited to the replacement of the heater and does not address the replacement of a nozzle.

U.S. Pat. No. 5,094,801 and 5,091,140 disclose an apparatus and method for replacing a heater sleeve. The original sleeve is removed and the original bore in the pressurizer is enlarged. An outer sleeve is installed in the bore with its upper end being seal welded to the cladding on the interior of the pressurizer. An inner sleeve is installed in the outer sleeve to extend into the pressurizer and is welded to the lower end of the pressurizer.

The known art addresses the replacement of the heater or the entire sleeve but does not address the replacement of that portion of a heater sleeve or nozzle penetration that extends beyond the exterior of the pressurizer.

SUMMARY OF THE INVENTION

The present invention addresses the aforementioned need in a straightforward manner. What is provided is a replacement nozzle that can be easily inserted and secured, has the added advantage of being removable, and is applicable to heater sleeves and nozzles. The original nozzle is cut off at the exterior surface of the pressure vessel shell. A portion of the original nozzle is then machined out of the nozzle penetration in the shell. The nozzle penetration is partially tapped. A seal ring is inserted in the shell penetration against the remaining portion of the original nozzle and a threaded replacement nozzle is screwed into place against the seal ring. The outer end of the replacement nozzle is provided with a flange. Jack bolts on the flange are used to cause a pressure plate to bear against an 0-ring to provide a seal on the exterior surface of the pressure vessel shell. The outside end of the replacement nozzle contains a weld prep for attaching any necessary piping thereto.

BRIEF DESCRIPTION OF THE DRAWINGS

For a further understanding of the nature and objects of the present invention, reference should be made to the following description, taken in conjunction with the accompanying drawings, in which like parts are given like reference numerals, and wherein.

DETAILED DESCRIPTION OF THE PREFERRED EMBODIMENT

Figure 1:
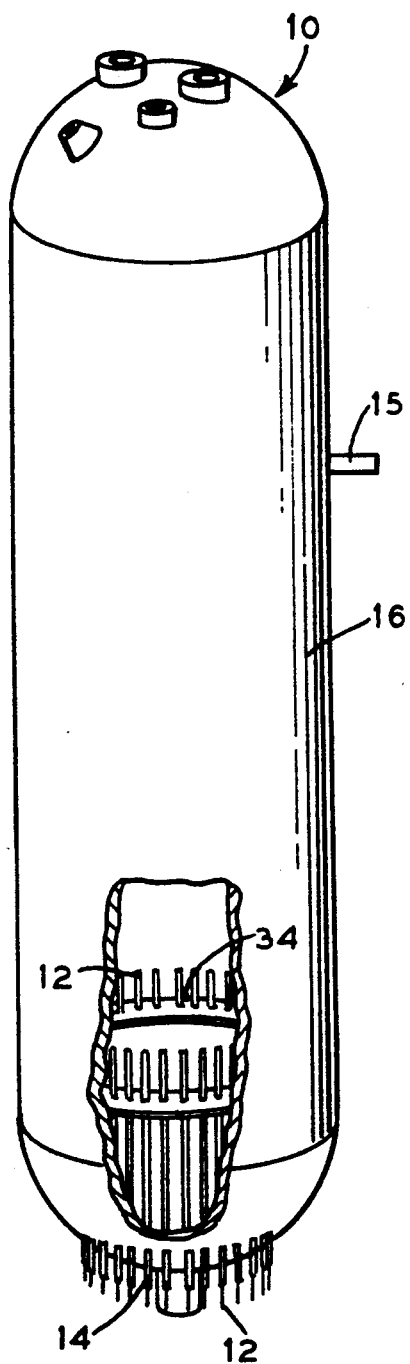
FIG. 1 is a partial cutaway view of a typical pressurizer in a nuclear reactor coolant system.
Figure 2:
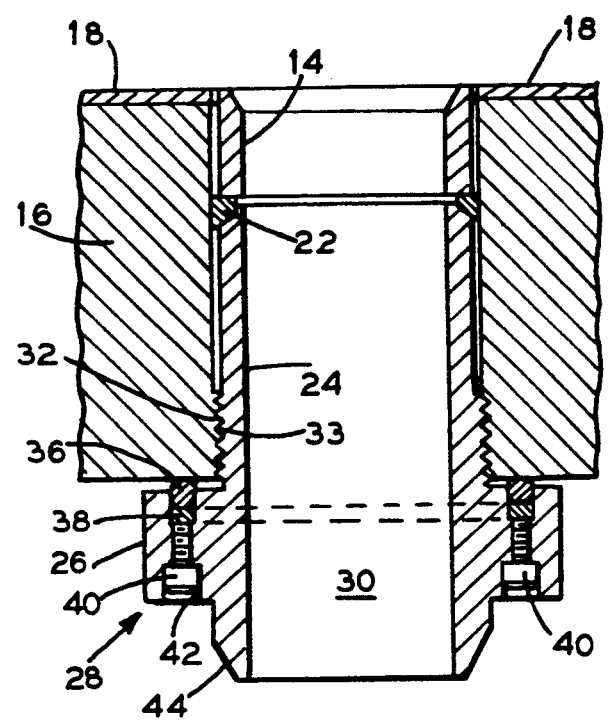
FIG. 2 is a detail sectional view illustrating the invention in its installed position.

FIG. 1 illustrates a typical pressurizer 10 used in a nuclear reactor coolant system. Pressurizer 10 is a vertical, cylindrical vessel with replaceable electric heaters 12 in its lower section. Heaters 12 extend through heater sleeves 14 in the vessel wall 16 into the lower portion of pressurizer 10. Heater sleeves 14 extend through the vessel wall 16 which is approximately six inches thick and made of carbon steel or low alloy steel. A plurality of nozzles such as that indicated by the numeral 15 may also extend through a bore in the vessel wall at a variety of locations on the pressurizer. Only one is shown for ease of illustration. As seen in FIG. 2, a cladding 18 normally made from stainless steel is used on the interior surface of the wall 16 for corrosion protection. For ease of illustration, heater 12 is not shown in FIG. 2. For purposes of simplicity, the followng description is directed to the replacement of a heater sleeve.

As seen in FIG. 2, the invention is generally indicated by the numeral 20. Replacement heater sleeve 20 is generally comprised of first seal ring 22, sleeve 24, flange 26 on sleeve 24, and means 28 for providing a seal between flange 26 and the exterior surface of pressurizer 10.

The following work must be performed before replacement heater sleeve 20 can be installed. The original electric heater 12 and original heater sleeve 14 exterior of pressurizer 10 are removed. A portion of original heater sleeve 14 in heater sleeve bore 30 is removed and heater sleeve bore 30 is partially tapped adjacent the exterior surface of vessel wall 16 to provide threaded area 32.

First seal ring 22 is positioned against original heater sleeve 14 inside heater sleeve bore 30. Sleeve 24 is threaded into bore 30 such that the upper end of sleeve 24 presses against first seal ring 22 to create a seal between original heater sleeve 14 and sleeve 24. Sleeve 24 is provided with threads 33 that threadably engage threads 32. It should be understood that reference to upper or lower ends of parts are merely for ease of reference and should not be considered as limiting to the elements of the invention. Sleeve 24 has flange 26 adjacent its lower end and positioned thereon such that flange 26 is located very near the external surface of pressurizer vessel wall 16 when sleeve 24 is in the installed position described above.

Figure 3:
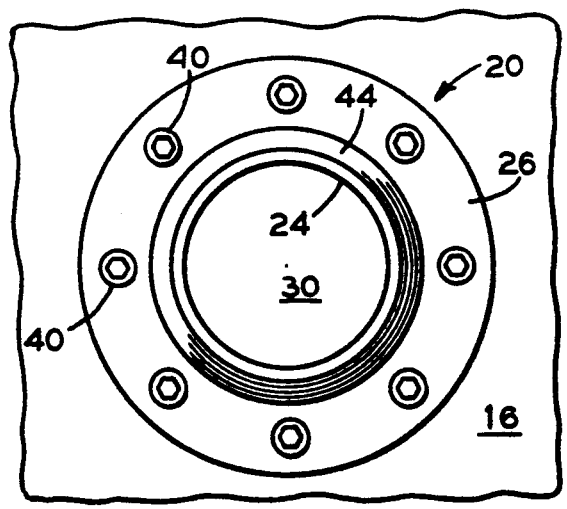
FIG. 3 is a plan view of the invention in its installed position.

Means 28 for providing a seal between flange 26 and the exterior of pressurizer 10 is incorporated into flange 26 and is generally comprised of second seal ring 36, disk 38, and jack bolts 40. Disk 38 is slidably received in a groove that extends around the upper end of flange 26. Second seal ring 36 is received in the groove on disk 38. A plurality of jack bolts 40 are threadably received in bores 42 spaced circumferentially around flange 26 (illustrated in FIG. 3). As seen in FIG. 2, each jack bolt 40 extends through bore 42 to bear against disk 38. In this manner, jack bolts 40 may be tightened or threaded into bores 40 a sufficient distance to cause disk 38 to in turn apply pressure to second seal ring 36. This forms a seal between flange 26 and the exterior of pressurizer 10. The provision of two seals, one at first seal ring 22 and one at second seal ring 36, serves to insure that pressurized coolant inside pressurizer 10 will not leak out of pressurizer 10 between replacement heater sleeve 20 and heater sleeve bore 30.

To replace a defective heater sleeve, the original heater 12 is removed. The original heater sleeve 14 exterior of pressurizer 10 and a portion of original heater sleeve 14 in heater sleeve bore 30 are removed. Heater sleeve bore 30 is partially tapped to provide threaded area 32 at its lower end. First seal ring 22 is positioned in heater sleeve bore 30 against original heater sleeve 14. Sleeve 24 is installed in heater sleeve bore 30 by threading sleeve 24 thereinto such that the upper end of sleeve 24 presses against first seal ring 22. This creates a seal between original heater sleeve 14 and sleeve 24. It should be understood that sleeve 24 and first seal ring 22 may be simultaneously installed in heater sleeve bore 30. Jack bolts 40 are then used to cause disk 38 to bear against second seal ring 36. This provides a seal between flange 26 and the exterior of pressurizer 10. A replacement heater is then installed through replacement heater sleeve 20. The replacement heater is welded in place utilizing weld prep 44 provided at the lower end of sleeve 24. Flange 26 and disk 38 have their surfaces that face or may contact the exterior of pressurizer 10 shaped to closely match the contour of that portion of pressurizer 10 where the work is being performed. The use of a replacement heater sleeve that has the same diameter as and is installed immediately adjacent the original heater sleeve maintains the original heater alignment and precludes the need for special alignment procedures.

It should be understood that the method and apparatus described and illustrated are applicable to the replacement of a heater sleeve or a nozzle. The terms heater sleeve and nozzle should be considered as interchangeable for the purposes of this description since it is common in the industry to refer to a heater sleeve as a heater nozzle. Therefore, reference to the replacement of a nozzle in the claims should be understood as being applicable to a nozzle or a heater sleeve.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a nuclear reactor coolant system pressurizer wherein an original nozzle exterior of the pressurizer and a portion of the original nozzle in the nozzle bore through the pressurizer have been removed and the nozzle bore partially tapped to provide threads therein, a replacement nozzle, said replacement nozzle comprising:
   a. a first seal ring positioned inside the nozzle bore against the original nozzle;
   b. a nozzle threadably engaged inside the nozzle bore against said first seal ring and extending beyond the exterior of the pressurizer;
   c. a flange extending radially outward from the portion of said nozzle extending beyond the exterior of the pressurizer; and
   d. means for providing a seal between said flange and the exterior of the pressurizer.

2. The replacement nozzle of claim 1, wherein said means for providing a seal between said flange and the exterior of the pressurizer comprises:
   a. a disk received on the upper end of said flange;
   b. a second seal ring positioned on said disk; and
   c. a plurality of bolts spaced circumferentially around said flange and threadably received in bores through said flange whereby application of pressure from said bolts to said disk causes said second seal ring to bear against the exterior of the pressurizer.

3. A method of replacing a damaged nozzle in a nuclear reactor coolant system pressurizer wherein the nozzle extends into the pressurizer through a nozzle bore in the wall of the pressurizer, comprising:
   a. removing the original nozzle on the exterior of the pressurizer and a portion of the original nozzle in the nozzle bore;
   b. partially tapping the nozzle bore to provide threads therein;
   c. threading a replacement nozzle having a first seal ring positioned on one end into the nozzle bore such that said first seal ring is pressed against the remaining portion of the original nozzle, said replacement nozzle having a flange extending radially therefrom and adjacent the lower end of said nozzle; and
   d. providing a seal between the flange on said replacement nozzle and the exterior of the pressurizer.

4. The method of claim 3, wherein the step of providing a seal between the flange and the exterior of the pressurizer comprises forcing a second seal ring positioned on the upper end of the flange into sealing contact with the exterior of the pressurizer.

* * * * *